United States Patent [19]
Brown

[11] 3,886,826
[45] June 3, 1975

[54] SURVEYING APPARATUS STAKE CUTTER

[76] Inventor: Robert L. Brown, 881 George Washington Hwy., Chesapeake, Va. 23323

[22] Filed: Aug. 20, 1974

[21] Appl. No.: 499,072

[52] U.S. Cl. ................. 83/13; 83/464; 83/522; 83/580; 83/581; 83/639; 83/701
[51] Int. Cl. ..................... B26d 5/12; B26d 7/02
[58] Field of Search ....... 83/13, 464, 522, 580, 581, 83/639, 701; 30/180, 210

[56] References Cited
UNITED STATES PATENTS

| | | | |
|---|---|---|---|
| 3,263,544 | 8/1966 | Marglien | 83/464 X |
| 3,438,129 | 4/1969 | Spangler | 83/580 X |
| 3,811,348 | 5/1974 | Brown | 83/13 |

*Primary Examiner*—Frank T. Yost
*Attorney, Agent, or Firm*—Mason, Fenwick & Lawrence

[57] ABSTRACT

An apparatus and method of providing surveyor stakes having a top end termination indicative of a desired elevation is disclosed comprising a hydraulic cylinder supporting a cutting blade to be actuated by the cylinder; the cylinder is supported on the lower end of a levelling rod along with a stake clamp to be adjacent a surveyor's stake during manual vertical positioning while being monitored through a transit; the stake clamp is actuated by a hand-actuated lever on the rod to hold the cutting blade fixedly with respect to a stake followed by actuation of the hydraulic cutting means by a manual hydraulic pump carried by the user when the blade is observed to be positioned at a desired elevation to cut the top of the stake and provide a resultant stake having a top end termination at the desired elevation.

14 Claims, 4 Drawing Figures

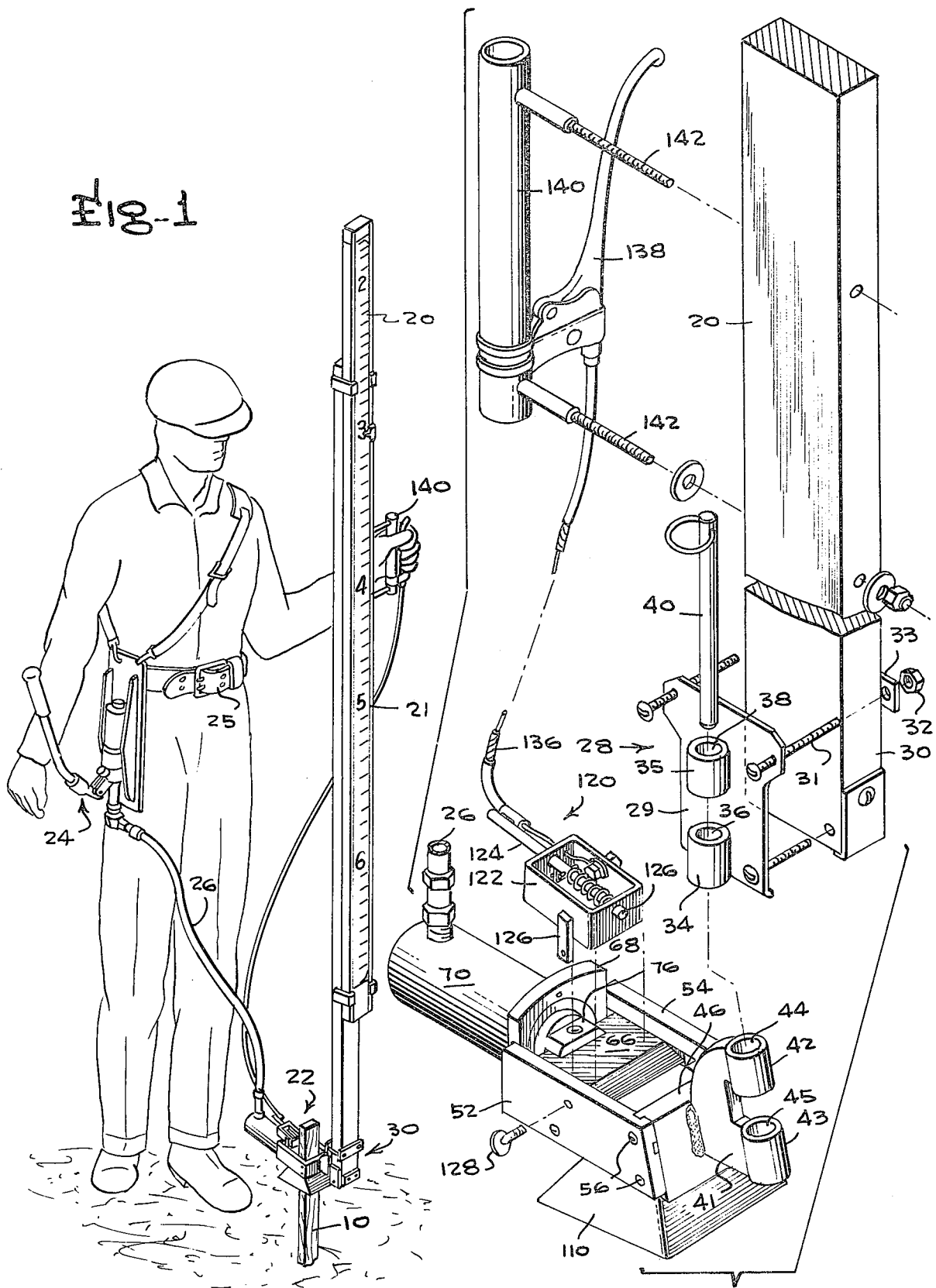

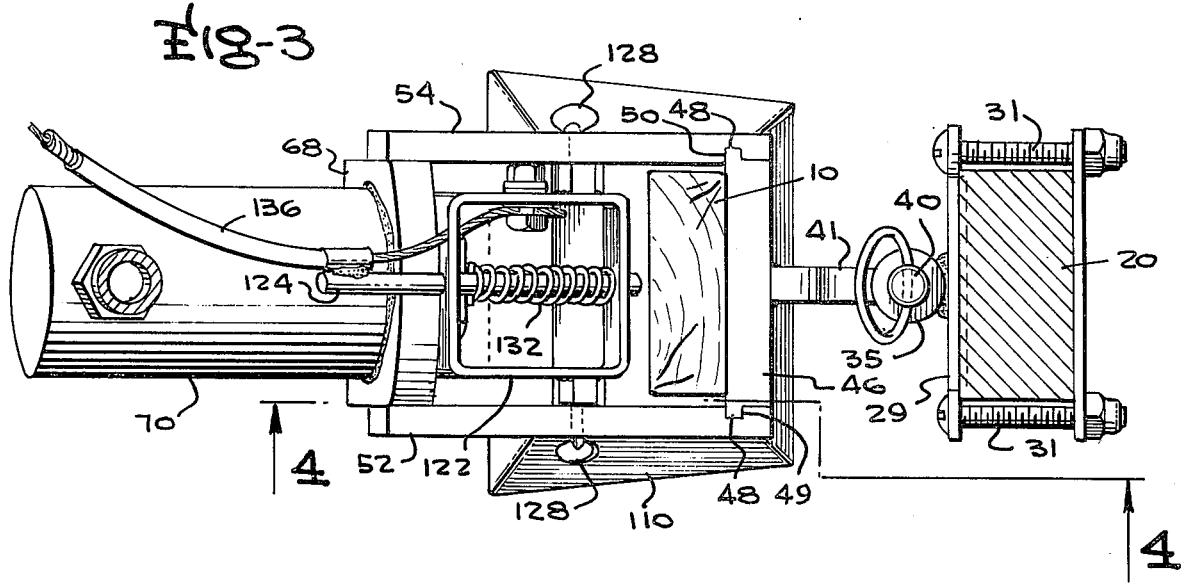
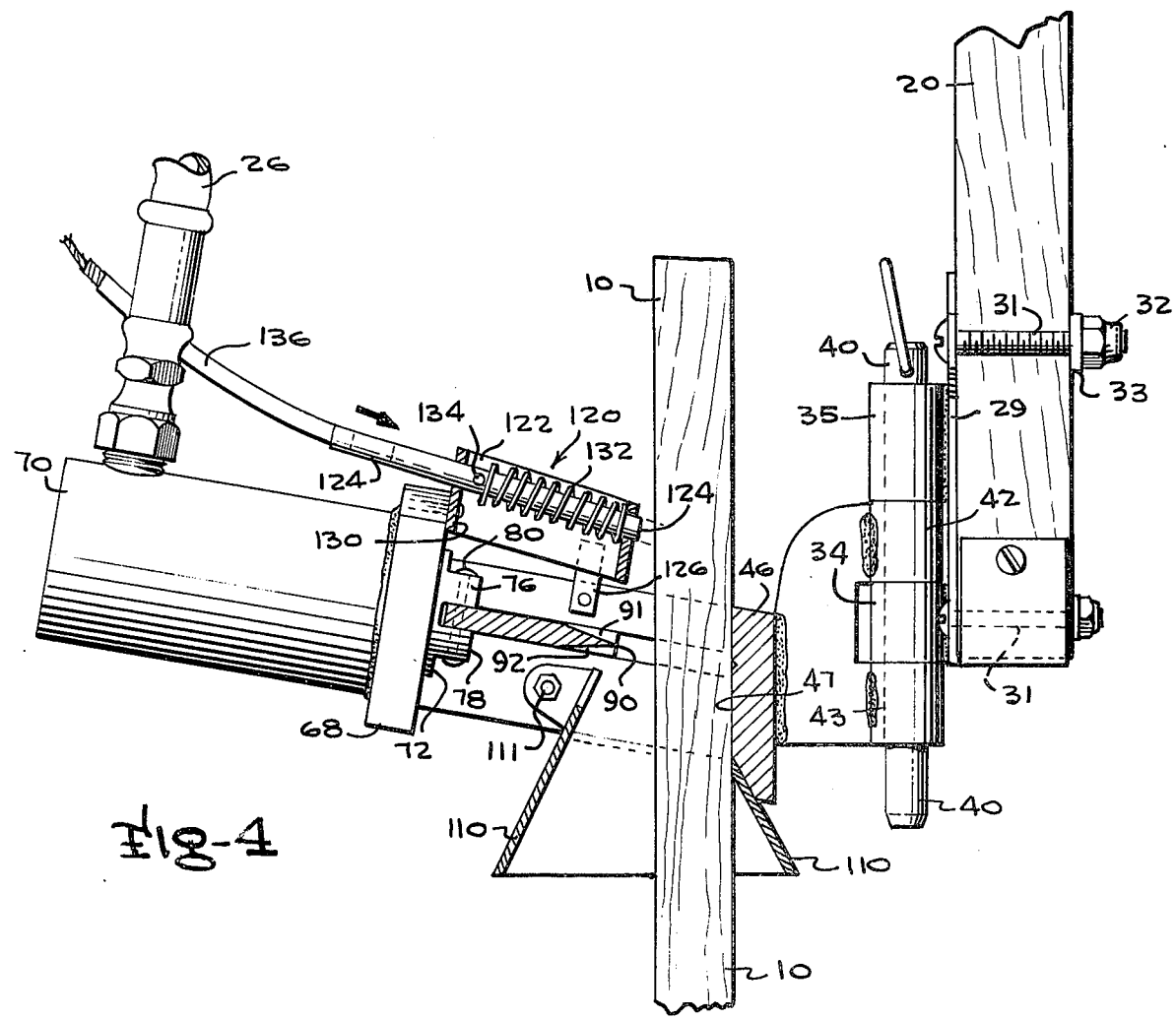

SURVEYING APPARATUS STAKE CUTTER

This invention is in the field of surveying equipment and is more specifically directed to an improvement in the surveying equipment for providing a surveyor's stake indicative of a desired elevation disclosed in my prior U.S. Pat. No. 3,811,348.

It has been the practice for surveyors to drive stakes into the ground while interrupting the stake driving operation to make intermittent checks on the elevation of the top of the stake by use of a transit and levelling rod engaged with the top of the stake so that the top of the stake will be driven downwardly until the desired level is reached. Unfortunately, the foregoing procedure, while the best known approach of providing stakes indicative of elevation prior to the invention of my above patent, has suffered from a number of drawbacks; for example, it frequently occurs that a stake is driven too far into the ground with its top end surface being below the desired elevation and it is then necessary to extract the stake and redrive it in an effort to properly position the top end surface of the stake. Moreover, the manual driving and elevation checking of the stake is a time consuming operation which increases the total cost of the surveying procedure.

Another problem frequently encountered with the prior practice of driving stakes while making intermittent elevation checks on the particular stake being driven arises from the fact that the stakes are frequently of relatively short length which results in only a short segment at the lower end of the stake being embedded in the earth at the time that the top end of the stake is positioned at the desired elevation. Such stakes are easily knocked over or otherwise accidentally mispositioned and must consequently be repositioned to the consequent inconvenience and extra cost to the surveyor.

Another frequently encountered problem with the prior known approach to providing surveyor's stakes having their tops at desired elevations is that the stakes are often pulled from the earth by small children or vandals. It is usually a relatively easy matter to pull the smooth-surfaced wooden stakes that are shallowly embedded in the soil from the soil and they consequently represent an easily fulfilled temptation to children and others. Consequently, it is frequently necessary to replace stakes that have been accidentally or deliberately removed or tampered with to the consequent additional work, delay and expense to the surveyor.

One approach to a solution of the foregoing problems has been to provide markings on the sides of a surveyor's stake indicative of the desired elevation. Such stakes obviously do not have to be driven with the precision necessary for achieving a desired top end positioning required of the most frequently employed surveying approach as discussed above. However, the marking of stakes with visual elevation indicators is time consuming and is frequently unsatisfactory since the stakes eventually become coated with dust or the like rendering the marking difficult, if not impossible, to see. Moreover, markings must be applied to all sides of the stake in order to be visible from any angle as is the top of the stake. Therefore, the provision of stakes having their top end termination indicative of the desired elevation remains superior to the employment of stakes having marks or the like on their outer surfaces.

Another approach to the solution of the aforementioned problems is that illustrated in U.S. Pat. No. 3,437,156 in which a metal spiral auger is employed as a stake with an electric motor serving to implant the auger into the earth downwardly to a desired elevation. The device of said last-mentioned patent will not work in soil containing rocks, roots or the like which would stop downward movement of the spiral auger. Also, the patent requires the employment of a portable battery and a rather complicated structure of substantial cost. Not only is the apparatus itself costly, the spiral metal stakes are much more costly (and also represent a greater temptation to thieves) than the commonly employed wooden stakes and employment of the apparatus of this patent is consequently relatively expensive.

While the invention of my aforementioned U.S. Pat. No. 3,881,348 represents a substantial improvement over the above-discussed prior art devices and provides a substantial solution to the problems inherent in the prior art devices, it has been found that under some adverse conditions, the device of said patent presents some operative difficulties which the present invention overcomes. More specifically, the invention of my prior patent comprises a hydraulic cutting menas mounted on the lower end of a levelling rod to be movable upwardly and downwardly adjacent a stake during a surveying operation. The levelling rod is monitored by a transist or other conventional surveying means in a conventional manner and, upon the rod arriving at a desired elevation, the cutting means is actuated by means of a hydraulic cylinder carried on a heavy belt of the user. It is necessary that the levelling rod be maintained at the desired elevation for the purpose of severing the stake to provide a resultant stake firmly embedded in the earth having its top surface at the desired elevation. Maintenance of the cutting blade at the desired elevation until such time as it can be actuated to engage the stake is sometimes difficult under adverse weather, surface or environmental conditions. Consequently, it sometimes occurs that the blade becomes mispositioned prior to the beginning of a cutting operation and the stake is then mistakenly severed at an improper elevation. However, in some instances, the error is noted before the severing operation occurs and correction can then be effected by repeating the vertical positioning of the cutting member while being monitored through a transit. In any event, such errors are time consuming and delay the completion of the surveying operation, and it is the primary object of this invention to eliminate such errors caused by the time interval prior to engagement of the cutter blade with the stake subsequent to positioning of the device at the desired elevation.

Therefore, the primary object of this invention is to provide a new and improved method and apparatus for providing survey stakes having their tops at desired elevation levels.

Achievement of the object of this invention is enabled through the provision of a hydraulically operated cutting means positionable over a vertically extending stake driven into the ground at sufficient distance to be firmly implanted and not easily removed. The vertically positionable cutting means is mounted on the lower end of a levelling rod so as to be movable upwardly and downwardly adjacent the stake surface.

Additionally, a manually operable clamp member is provided adjacent the stake with the clamp member being actuable by means of a hand operated actuator lever mounted on a handle supporting the levelling rod and connected to the clamp member by a flexible mechanical power cable. Upon actuation of the actuator lever, the clamp member immediately engages the stake to hold the cutting means and the levelling rod fixedly with respect to the stake to enable a severing of the stake by the cutting means. The elevation of the cutting means is constantly monitored by viewing the rod through a transit in a conventional manner and upon the rod arriving at a desired elevation, the clamping means is immediately actuated by the handle lever mounted on the levelling rod to clamp the cutting means in a fixed position wiith respect to the stake. The cutting means can then be actuated in a more leisurely manner than is possible with my prior invention since there is no danger of the cutting means being moved from the desired elevation position after the stake has been clamped. Consequently, the stake is easily severed at the desired elevation.

The cutting means comprises a hydraulic piston and cylinder to which a cutting blade is mounted with the cutting blade being guided by slotted guide plates for linear forward movement toward the stake to be severed. The rear side of the stake is engaged by a backup plate connected to the forward ends of the guide plates for preventing movement of the stake away from the blade as the blade is forced through the body of the stake.

The clamping means comprises a support frame fixedly connected to the guide plates of the cutting means. A clamp pin is mounted for reciprocation on the support frame for movement between a retracted position and an extended position. When in the retracted position, the clamp pin does not engage the stake engaged by the backup plate so that the entire assembly is capable of vertical adjustment under the instructions of the surveyor at the transit until such time as the desired vertical elevation is achieved. At this time, a handle mounted actuator lever mounted on the support handle for the levelling rod is actuated by the hand of the user to immediately cause the reciprocatingly mounted clamp pin to move to a forward or extended position to engage the stake and clamp the stake between the pin and the backup plate. Consequently, any further vertical movement of the apparatus is prevented. The cutting means can then be actuated by means of a hydraulic pump carried on a belt by the user and connected to the cutting means by means of a flexible hose member.

The entire assembly mounted on the lower end of the levelling rod is supported by a pivotal connection so that the levelling rod can be oriented about its vertical axis to face the transit regardless of the direction of the transit from the particular stake. However, it should be understood that the cutting means remains in propoer position engageable with the stake to be severed and at a constant elevation with respect to the levelling rod.

A better understanding of the manner in which the preferred embodiment of the invention achieves the foregoing objects will be enabled when the following written description is read conjunction with the appended drawings in which:

FIG. 1 is a perspective view illustrating the manner in which a user of the preferred embodiment employs the device;

FIG. 2 is an exploded perspective view of the primary components of the preferred embodiment;

FIG. 3 is a top plan view of the preferred embodiment; and

FIG 4 is a sectional view taken along lines 4—4 of FIG. 3.

Attention is initially invited to FIG. 1 which illustrates the preferred embodiment comprising a conventional multipart levelling rod 20 having indicia 21 on its face and to the lower end of which a cutting means, generally designated 22, is fixedly connected. A power source in the form of a manually operable hydraulic pump 24 carried on a belt 25 of the user is connected to the cutting means 22 by a flexible hydraulic hose 26. It is the purpose of the preferred embodiment to effect a precise cutting of the top of a surveying stake 10 at a predetermined elevation.

A supporting bracket 28 including a base plate 29 is connected to the lower end 30 of the levelling rod 20 by means 31, 32, 33 etc. and includes first and second pivot support lugs 34 and 35 having aligned apertures 36 and 38 respectively through which a hinge pin 40 having an axis parallel to the axis of rod 20 extends.

A hinge bracket arm 41 having aligned support lugs 42 and 43 with respective apertures 44 and 45 is welded to a backup plate 46. Lugs 42 and 43 are interleaved with lugs 34 and 35 to receive hinge pin 40 as shown in FIG. 4. Backup plate 46 includes an inwardly facing stake engaging surface 47 (FIG. 4) and is provided with end guide lugs 48 on each end which are received in slots 49 and 50 respectively provided on the inwardly facing surfaces of first and second blade guide plates 52 and 54. Additionally, apertures are provided in the ends of the blade guide plates 52 and 54 to communicate with tapped openings in each side edge of the backup plate 46 with threaded retaining screws 56 extending through the openings to maintain the backup plate in fixed position on the outer ends of the first and second guide plates 52 and 54.

Hinge pin 40 permits the rotative positioning of the cutting means 22 about the axis of pin 40 and with respect to the levelling rod 20. Consequently, the backup plate 46 is capable of orientation at any desired rotative angle with respect to the levelling rod to enable the indicia on rod 20 to always face the surveying instrument with which the appratus is being used.

Blade guide plates 52 and 54 additionally respectively include blade guide slots which face inwardly and in which the guide side edges of a movable cutting blade 66 are positioned for movement toward and away from the backup plate 46 as more fully illustrated in U.S. Pat. No. 3,811,348. The rearmost ends of the blade guide plates 52 and 54 are welded or otherwise fixedly connected to the side edges of a main frame shoulder plate 68 which is apertured to provide support for a hydraulic cylinder 70 welded to its outer surface.

A power piston 72 is positioned on the interior of the hydraulic cylinder 70 with an internal coil spring (not shown) extending between the piston 72 and a lug abutment means in the cylinder for biassing the piston 72 inwardly to the lift as shown in FIG. 4. The outer end of the piston 72 comprises first and second blade retaining lugs 76 and 78 extending unitarily from the main piston body. A blade retaining pin 80 extends through apertures in the blade retaining lugs 76 and 78 and an aperture in blade 66 for providing a fixed drive connection between the piston and the blade in an obvious manner.

Cutting blade 66 includes a sharp forward edge 90 formed at the apex of tapered surfaces 91 and 92 of equal dimensions so that the sharp forward edge 90 is positioned in a plane medially of the fixed body portion of the blade member 66 as will be obvious from inspection of FIG. 4 of the drawings. Surface 47 of backup plate 46 is canted at an acute angle with respect to the blade guide slots in blade guide plates 52 and 54 so that canted orientation of the blade 66 effectively positions the lower surface 92 in substantially perpendicular orientation to the stake 10 whereby forward movement of the blade 66 through the stake effects a cut along a surface that is perpendicular to the sides of the stake and is essentially in a horizontal plane.

Flexible hydraulic hose 26 is connected to the ends of cylinder 70 as shown in FIG. 4 so that actuation of the conventional hydraulic pump power source 24 provides pressurized hydraulic fluid to act upon piston 72 to consequently move blade 66 to the right as viewed in FIG. 4 to effect a cutting operation along a horizontal surface of stake 10. Backup plate 46 provides resistance to the forward cutting movement of the blade 66 in an obvious manner. Power source 24 includes a pressure release valve for permitting the spring in the cylinder to return piston 72 to its retracted position illustrated in FIG. 4 upon completion of the cutting operation.

An inverted flairing guide member 110 is connected to the side guide plates 52 and 54 by connector 111 and permits the easy insertion of the top end of a stake 10 upwardly through a stake receiving opening defined by the cutting edge 90, the inwardly facing sides of the guide plates 52 and 54 and the inwardly facing surfaces 47 of the backup plate 46.

A clamping means generally designated 120 comprising a main support frame 122 of rectangular configuration supporting a reciprocating clamp pin 124 is mounted above and between the guide plates 52 and 54 forwardly of the shoulder plate 68. The rectangular main support frame 122 is connected to the side guide plates 52 and 54 by side lug plates 126 is held in position by thumb screw members 128. Additionally, the rear portion of frame 122 is affixed to the shoulder plate 68 by a rear lug plate 130 as shown in FIG. 4. A compression spring 132 encircling pin 124 extends between a pin 134 mounted diametrically in the pin 124 and an internal side wall of the frame 122 for biassing the pin 124 to the left as viewed in FIGS. 3 and 4. A conventional mechanical power cable 136 is connected to the frame 122 and to pin 124 for providing reciprocation of the pin to the right overcoming the force of spring 132 as viewed in FIG. 4 upon actuation of a handle mounted clamping means actuator lever 138. Actuator lever 138 is mounted on a support handle 140 fixedly connected by members 142 etc. to a central portion of the rod 20 for enabling manual support of the rod by the hand of the user as shown in FIG. 1. Additionally, the hand of the user supportiong the rod by handle 140 is capable of quickly operating actuator 138 to move the reciprocating clamp pin 124 forwardly to engage the stake 10 and prevent any subsequent vertical movement of the cutter blade 66 etc. with respect to the stake. The very quick manner in which the lever 138 can be actuated enables a fixed positioning of the cutting means with respect to the stake which is retained until the hydraulic pump unit 24 can be actuated to effect the cutting operation.

In use, the levelling rod 20 and the associated cutting means 22 etc. is moved upwardly and downwardly by the user while being monitored by a helper through use of a transit or the like. When the levelling rod 20 reaches a desired level, the user of the device immediately actuates the actuator 138 to clamp the stake 10 in fixed relation to the cutting means before any deviation from the desired elevation can occur. Hydraulic pump means 24 is then actuated to cause blade 66 to sever the stake along a top surface which is at the exact desired elevation for the top of the particular stake. It will be apparent that the provision of an elevation stake by the foregoing operation is much more quickly effected than is possible with the prior approach of driving and intermittently checking the elevation of a particular stake until such time as the top end of the stake is properly positioned. Moreover, the subject invention enables the stakes to initially be driven to a substantial depth to achieve greater stake stability and to inhibit stake removal in order that a stake cannot easily be removed by unauthorized persons.

Therefore, it should be appreciated that the subject invention enables a more rapid provision of stakes having their top surfaces at a desired elevation than is possible even with the device of my prior patent while also enabling the use of stakes that are not as easily tampered with and/or accidentally moved.

Numerous modifications of the subject invention such as, for example, the employment of electrical or mechanical type stake clamping and/or cutting means will undoubtedly occur to those of skill in the art; however, it should be understood that the spirit and scope of the invention is to be limited solely by the appended claims.

I claim:

1. An apparatus for providing a vertically oriented stake having a top end termination at a desired elevation, said apparatus comprising a vertically movable support member, cutting means capable of severing a stake and selectively operable stake clamping means mounted on said support member for vertical movement adjacent a stake having a top end termination above said desired elevation for clampingly engaging said stake to prevent movement of said support member relative to said stake and indicator means on said support member indicative of the elevation of the cutting means so that actuation of said stake clamping means can be effected when the cutting means is at said desired elevation to maintain said cutting means at said desired elevation until said cutting means is actuated to provide a stake having a top end termination at said desired elevation.

2. The invention of claim 1 additionally including manually operable actuator means for said stake clamping means.

3. The invention of claim 2 wherein support means comprises a levelling rod and additionally including support handle means attached to said levelling rod and dimemsioned for manual engagement for enabling unitary support of said levelling rod, said cutter means and said clamping means.

4. The invention of claim 1 wherein said support means comprises a levelling rod and additionally including support handle means attached to said levelling rod and dimensioned for manual engagement for enabling unitary support of said levelling rod, said cutter means and said clamping means.

5. The invention of claim 1 wherein said support means comprises a levelling rod and additionally including hydraulic power means connected to said cutting means for actuating said cutting means.

6. The invention of claim 1 wherein said support means comprises a levelling rod and further including hydraulic power maans connected to said cutting means for actuating said cutting means and bracket means connecting said cutting means and said clamping means to the lower end of said levelling rod.

7. The invention of claim 1 wherein said support means comprises a vertical rod and said cutting means comprises a movable blade, guide means supportimg said movable blade for linear path of movement, hydraulic power means connected to said movable blade moving said movable blade along said linear path of movement, bracket means connectingly supporting said movable blade, said guide means, said clamping means and said hydraulic power means to the lower end of said rod and backup means engageable with a side of said stake opposite said blade for preventing movement of said stake by engagement of said blade with the stake.

8. The invention of claim 7 wherein said clamping means comprises a reciprocable member mounted on said bracket means for movement toward said backup means to clamp said stake between said reciprocable member and said backup means upon actuation of said clamping means.

9. The invention of claim 8 additionally including a manually operable hydraulic pump carried by the user of the apparatus and hose means connecting said hydraulic pump to said hydraulic power means whereby the user of the apparatus can actuate said hydraulic power means from various positions limited by the length of said hose means.

10. The invention of claim 1 wherein said support means comprises a vertical rod, support handle means attached to said vertical rod and dimensioned for supportive receipt in the hand of a user for enabling unitary movement of said vertical rod, said clamping means and said cutter means and additionally including manually operable actuator means for said stake clamping means mounted on said handle means and connected to the clamping means by a mechanical power cable for actuation by the same hand of the user engaging said handle means.

11. The invention of claim 10 wherein said cutting means comprises a movable blade, guide means supporting said movable blade for linear path of movement, hydraulic power means connected to said movable blade moving said movable blade along said linear path of movement, bracket means connectingly supporting said movable blade, said guide means, said clamping means and said hydraulic power means to the lower end of said rod and backup means engageable with a side of said stake opposite said blade for preventing movement of said stake by engagement said blade with the stake.

12. The invention of claim 11 additionally including a manually operable hydraulic pump carried by the user of the apparatus and hose means connecting said hydraulic pump to said hydraulic power means whereby the user of the apparatus can actuate said hydraulic power means from various positions limited by the length of said hose means.

13. A method of providing a vertically positioned survey stake with a top end termination at a desired elevation, said method comprising the steps of vertically moving support means supporting a selectively actuable cutting means and a selectively actuable clamping means adjacent a vertically extending stake having a top end termination above the desired elevation, monitoring movement of the selectively actuable cutting means and terminating the vertical movement of the selectively actuable cutting means when said selectively actuable cutting means arrives at said desired elevation, actuating said clamping means to clamp said supporting means to said stake to hold said cutting means in fixed position relative thereto and actuating said selectively actuable cutting means at said desired elevation to provide a survey stake having a top end termination at said desired elevation.

14. The method of claim 13 wherein the elevation of said selectively actuable cutting means is monitored by visual inspection through a transit of a levelling rod comprising said support means to which the selectively actuable cutting means is supportingly attached.

* * * * *